(12) United States Patent
Dougherty et al.

(10) Patent No.: US 7,028,327 B1
(45) Date of Patent: Apr. 11, 2006

(54) USING THE ELECTRONIC PROGRAM GUIDE TO SYNCHRONIZE INTERACTIVITY WITH BROADCAST PROGRAMS

(75) Inventors: Brian P. Dougherty, Lafayette, CA (US); C. Leo Meier, Berkeley, CA (US)

(73) Assignee: Wink Communication, Alameda, CA (US)

( * ) Notice: Subject to any disclaimer, the term of this patent is extended or adjusted under 35 U.S.C. 154(b) by 0 days.

(21) Appl. No.: 09/538,602

(22) Filed: Mar. 29, 2000

Related U.S. Application Data

(60) Provisional application No. 60/179,825, filed on Feb. 2, 2000.

(51) Int. Cl.
*H04N 7/173* (2006.01)

(52) U.S. Cl. ............................ 725/93; 725/40; 725/51; 725/109; 725/112

(58) Field of Classification Search ............ 725/39–40, 725/51, 109, 112–113
See application file for complete search history.

(56) References Cited

U.S. PATENT DOCUMENTS

| | | | |
|---|---|---|---|
| 4,751,578 A | 6/1988 | Reiter et al. | |
| 5,307,173 A | 4/1994 | Yuen et al. | |
| 5,334,975 A | 8/1994 | Wachob et al. | |
| 5,343,239 A | 8/1994 | Lappington et al. | |
| 5,400,402 A | 3/1995 | Garfinkle | |
| 5,448,568 A | 9/1995 | Delpuch et al. | |
| 5,504,896 A | 4/1996 | Schell et al. | |
| 5,539,920 A | 7/1996 | Menand et al. | |
| 5,557,317 A | 9/1996 | Nishio et al. | |
| 5,559,550 A | 9/1996 | Mankovitz | 348/6 |
| 5,563,648 A | 10/1996 | Menand et al. | |
| 5,583,563 A | 12/1996 | Wanderscheid et al. | |
| 5,585,858 A * | 12/1996 | Harper et al. | 348/485 |
| 5,586,264 A | 12/1996 | Belknap et al. | |
| 5,652,615 A | 7/1997 | Bryant et al. | |
| 5,657,072 A | 8/1997 | Aristides et al. | 348/13 |
| 5,675,373 A | 10/1997 | Joiner et al. | |
| 5,689,799 A | 11/1997 | Dougherty et al. | |

(Continued)

FOREIGN PATENT DOCUMENTS

EP 0942595 A2 3/1999

OTHER PUBLICATIONS

Advanced Television Enhancement Forum Specification (ATVEF), Version 1.1r26, Feb. 2, 1999, pp. 1-37.

(Continued)

*Primary Examiner*—Kieu-Oanh Bui
(74) *Attorney, Agent, or Firm*—Schwegman, Lundberg, Woessner & Kluth P.A.

(57) ABSTRACT

In a broadcasting system, an electronic program guide (EPG) is used to determine what broadcast program is on a given channel at a given time in a given location. With the particular determined broadcast program as an input, timing offset objects defining interactive content related to the determined broadcast program can be retrieved from a timing offsets database. Each timing offset object specifies a time from the beginning of the program, an act to perform at the time, and a reference to interactive content on which to perform the act at the time. With the reference to the interactive content as an input, an interactive application or other interactive content can be retrieved from an interactive content database. The EPG, the timing offsets database, and the interactive content database may be located logically or physically together or separately, and they may be cached locally or referenced from an external source.

36 Claims, 8 Drawing Sheets

U.S. PATENT DOCUMENTS

| | | | |
|---|---|---|---|
| 5,719,618 A | 2/1998 | Park | |
| 5,729,279 A | 3/1998 | Fuller | |
| 5,768,539 A | 6/1998 | Metz et al. | 395/200.79 |
| 5,774,664 A * | 6/1998 | Hidary et al. | 725/110 |
| 5,781,228 A | 7/1998 | Sposato | |
| 5,790,198 A | 8/1998 | Roop et al. | 348/460 |
| 5,818,440 A | 10/1998 | Allibhoy et al. | |
| 5,819,034 A | 10/1998 | Joseph et al. | |
| 5,826,166 A | 10/1998 | Brooks et al. | |
| 5,835,717 A | 11/1998 | Karlton et al. | |
| 5,848,352 A | 12/1998 | Dougherty et al. | |
| 5,850,447 A | 12/1998 | Peyret | |
| 5,861,881 A | 1/1999 | Freeman et al. | |
| 5,872,589 A | 2/1999 | Morales | 348/13 |
| 5,880,720 A | 3/1999 | Iwafune et al. | |
| 5,931,908 A * | 8/1999 | Gerba et al. | 709/219 |
| 5,937,331 A | 8/1999 | Kalluri et al. | |
| 5,970,206 A | 10/1999 | Yuen et al. | 386/83 |
| 5,974,222 A | 10/1999 | Yuen et al. | 386/83 |
| 6,006,256 A | 12/1999 | Zdepski et al. | |
| 6,008,802 A | 12/1999 | Iki et al. | 345/327 |
| 6,018,768 A | 1/2000 | Ullman et al. | 709/218 |
| 6,021,433 A | 2/2000 | Payne et al. | |
| 6,061,719 A | 5/2000 | Bendinelli et al. | 709/218 |
| 6,064,438 A | 5/2000 | Miller | |
| 6,181,335 B1 | 1/2001 | Hendricks et al. | |
| 6,256,785 B1 * | 7/2001 | Klappert et al. | 725/136 |
| 6,295,647 B1 | 9/2001 | Ramaswamy | |
| 6,415,438 B1 * | 7/2002 | Blackketter et al. | 725/136 |

OTHER PUBLICATIONS

Evain, J.-P., The Multimedia Home Platform—an overview, EBU Technical Department Review—Spring 1998.

Pending United States patent application, "Automated Control of Interactive Application Execution Using Defined Time Periods," U.S. Appl. No. 09/431,001, filed Nov. 7, 1999.

Pending United States patent application, Automatic Control of Broadcast and Execution Of Interactive Applications To Maintain Synchronous Operation With Broadcast Programs: Ser. No. 09/333,724, filing date Jun. 15, 1999.

Pending United States patent application, Automated Retirement of Interactive Applications Using Retirement instructions for Events and Program States, U.S. Appl. No. 09/334,131, filed Jun. 15, 1999.

Statement from first named inventor concerning Cited Reference entitled Pending United States patent application, Automated Retirement of Interactive Applications Using Retirement instructions for Events and Program States, "U.S. Appl. No. 09/334,131, filed Jun. 15, 1999."

Wink Communications, Technical Specification, mSubject: 5.2.17 Serverinfo Define, Dec. 31, 1995.

ntl Group Ltd. 2000, *Interactive Digital Television* [online], [retrived on Nov. 21, 2000]. Retrieved from the Internet <URL: http://www.ntl.com/guides/digitaltv/interactive. asp>, 2 pages.

* cited by examiner

Figure 1 (Prior Art): Locations of potential corruption or loss of signal carrying Interactive Application

USING THE ELECTRONIC PROGRAM GUIDE TO SYNCHRONIZE INTERACTIVITY WITH BROADCAST PROGRAMS

CROSS-REFERENCE TO RELATED APPLICATION

The present application claims priority from U.S. Provisional Patent Application Ser. No. 60/179,825, entitled "Synchronizing the Delivery of Digital Information—Interactive Applications, Data, and/or Content—With Broadcast Television Programs and Advertisements", filed on Feb. 2, 2000.

FIELD OF THE INVENTION

The present invention relates generally to the field of interactive television, and more particularly to the automated control of interactivity in synchrony with television broadcast programs.

BACKGROUND OF THE INVENTION

Interactive television attempts to augment broadcast programs with viewer selectable interactivity. This interactivity is typically delivered in the form of interactive content, such as an interactive application, associated with the broadcast program. An interactive application allows the viewer to participate, often in conjunction with events or situations arising in the broadcast program. The interactive content that accompanies a particular broadcast program may be displaced on the television screen simultaneously with the broadcast of the broadcast program, and if so, likely covers a portion of the viewing screen of the broadcast program. For example, a broadcast game show may be accompanied by interactivity that allows the viewer to play along and input answers to questions being posed during the show. This interactivity is displayed on only a portion of the television screen, so as to allow the viewer to continue to watch the broadcast program.

For interactivity that accompanies a broadcast program, it is desirable to maintain the interactivity in synchrony with the broadcast program. This means that the interactivity should be available to the viewer whenever the broadcast program that it accompanies is being broadcast, and that any state information that the viewer has created, e.g. an accumulated point total in a game, should be maintained, even if the broadcast program is temporarily suspended and then resumed, for example, during a commercial break.

If further means that the interactivity should not be displayed when the accompanying broadcast program is not being broadcast or is otherwise interrupted. In particular, proper synchrony requires that the interactivity for a television show not be displayed when a commercial is broadcast during the show. This is for two reasons. First, the commercial may have its own interactivity accompanying it, such as a form for the user to request product information about a product advertised during the commercial. Thus, the commercial's interactivity must be displayed, and yet the show's interactivity must be re-displayed when the commercial (or series of commercials) is over and the television show is resumed. Redisplay of the show's interactivity should be prompt and as noted, should preserver the state information that was available when the commercial began. For example, if the viewer was accumulating points in an interactive game, then the accumulated points should be available when the show's interactivity is resumed. This first concept also holds true for interactivity related to just a portion of a show. For example if interactivity is displayed allowing the viewer to order trousers like whose worn by the show's host, the viewer's accumulated points should gain be available when the interactive trousers promotion disappears.

Second, even if the commercial(s) does not have its own interactivity, it is inappropriate to display the interactivity of the show during the commercial. This is because the interactivity will override a portion of the television screen, thereby covering up part of the commercial, which is unacceptable to the advertiser that paid for the commercial to be broadcast. Also, the interactivity for the show is not associated with the commercial, and its appearance may confuse the viewer.

It is also desirable to maintain the interactivity in synchrony with particular events on the broadcast program. This means that a particular interactive element should be available to the viewer only when a corresponding broadcast event takes place on the broadcast program. Take the example of the broadcast game show. At the moment that the broadcast program displays the game show host offering a question to an in-studio contestant, it would be desirable for the associated interactive application to display a prompt inviting the viewer to answer the same question. Likewise, as the contestant begins to give has answer aloud, the interactive application would inform the viewer that "time is up" and cease to accept viewer input.

Accordingly, it is desirable to provide an interactive television system, method, and software products that correctly synchronize the interactivity of various broadcast programs as well as events during those programs, and accommodate the interruption of broadcast programs by other broadcast programs.

One approach in the art involves sending the interactive application along with the broadcast program from the national network to the local affiliates. One method specifically is to place a server with the ability to insert an interactive application into the vertical blanking interval (VBI) of a television broadcast at the national network uplink facility. The server integrates with the network playlist system or other program-identifying techniques to insert interactive applications appropriate for the current television program. The program-identifying techniques provide needed timing information for events such as broadcast program starts and stops, commercial break starts and stops, and interruption of either by the start of a second broadcast program. An overview of this early approach is illustrated in FIG. 1.

In this early approach, a server module (software application) running on a broadcast server (BS) 110 receives real-time information on the current video program being broadcast from the playlist control system 120. The playlist control system 120 controls the sequencing of pre-recorded video content (shows and advertisements) shown here as video sources 130. This information is used to insert an interactive application, content, or data into the video stream via the data insertion unit (DIU) 140.

The combined video and interactive application is then delivered (typically via satellite 170 as shown here) to a local network affiliate 160 where the application is either delivered over the air 162 to an interactive enabled settop 150 or over a cable system that re-retransmits the local signal 164 to an interactive enabled settop 150.

In reality, this configuration sometimes fails to deliver interactive television. One problem is that the interactive application can be lost, destroyed, or knocked out of synch with the television program between insertion of the application into the video stream by the data insertion unit 140, and reception by an interactive enabled settop 150. There are technical barriers to delivering interactive content synchronized with television program all along the path from the national network to the local affiliate. Several locations of potential difficulties 199 are illustrated in FIG. 1, and some of the technical barriers are described below.

Multiple Network Feeds—broadcast networks have multiple feeds to provide time shifted delivery of content for each time zone. The equipment used to record and replay video content for different time zones may inadvertently destroy the inserted interactive application by not properly recording the VBI lines that carry it.

Digital Uplinks—some networks digitally comprises their signal or convert the signal in some other manner that may not preserver the VBI in which the inserted interactive application is transmitted. Since the digital compression facility is not expecting useful data in the VBI, the interactive application is not compressed and carried over into the digitized system along with the broadcast program, and thus is not available for the user.

Local Affiliate Issues—not only may data placed in the video signal be inadvertently destroyed by equipment at the local affiliate, but well-intended local affiliates can corrupt or destroy the interactive application while time shifting the network feed. Time shifting is achieved by recording the video content from a network feed, but playing it back to the viewing audience at a later time. The video recording equipment can either fail to reload the VBI or improperly record it, thus eliminating the interactive application.

What is needed is a way to deliver the synchronized interactivity along with the broadcast program it was intended to accompany without losing the interactivity portion before the broadcast reaches the user.

A further difficulty is that the resource and bandwidth capabilities of the subnetworks that receive the network broadcast vary significantly. It would be desirable to send customized variations of interactive applications to each subnet. For example, local-into-local service may take the top few broadcast network channels in the country's top 25 markets and rebroadcast those channels as digitally encoded signals so that they can be seen outside of their local markets. Both the receiving hardware and broadcast bandwidth allow a richer application (e.g. with more or better features, options, functions, graphics, or sound) to be delivered to the consumer using this technique. However, existing approaches at best merely pass along an existing interactive application as it was originally broadcast, without taking advantage of the additional subnet bandwidth.

Accordingly, it is desirable to delivery various types and qualities of synchronized interactivity with the various cable (or other broadcasting) systems' broadcasts of the same program based on differing hardware and bandwidth capabilities.

SUMMARY OF THE INVENTION

The present invention provides for automated control of interactivity to maintain synchronous display of the interactivity and its respective broadcast program regardless of signal path corruption and other technical barriers along the broadcast path that may interfere with the conveyance of the interactivity in synchrony with the broadcast program.

In accordance with the present invention, the interactive content need not accompany the broadcast program all the way along the unreliable path that begins at the national networks. Instead, the broadcast program is augmented with the interactive content at a point further along the path toward the viewer. Either a server at the local network or cable head end, or the viewer's own consumer premise equipment (CPE) can control the identification of the broadcast program, and the coordination of the broadcast program with associated interactive content and other data.

The first step in augmenting a broadcast program with its proper interactive content is to identify the broadcast program. To do so, a device, such as the CPE, references an Electronic Program Guide. Electronic program guides for television systems are known in the art, particularly with regard to cable television systems. They are also known as electronic television program guide schedule systems. The Electronic Program Guide may be broadcast to and stored on a CPE, or be resident on a server on a network such as the Internet and be accessed through a CPE. Conventionally, the EPG is used by viewers to visually determine the correct timing or channel for a particular television show they would like to watch, or to find out generally "what's on TV." The Electronic Program Guide is a database (also called "the EPG database") that provides schedule information for broadcast (including cablecast) programs that may be available for viewing on, for example, a television. The database coordinates geographic location, local time, and channel information with a corresponding broadcast program. A viewer's CPE thus supplies the EPG database with information regarding what channel is being watched, at what time, and in what geographic area (or on what cable or other system), and the EPG database returns data regarding which broadcast program is being watched, such as a program identifier.

In accordance with the invention, the program identifier from the EPG is then coordinated with a list of timing offset objects specific to the broadcast program. In one embodiment, the CPE accomplishes this coordination as follows. Supplying the program identifier retrieved from the EPG as an input, the CPE references a timing offsets database or an interactive content database that correlates the broadcast program identifier with the appropriate timing offsets or the appropriate interactive content. The referenced timing offsets database may be self contained, or it may be a part of the EPG database or a content database. The referenced timing offsets database may be located on the CPE, on a server at the local affiliate, or on a server on another network, such as the Internet. In one embodiment, the timing offsets database returns the timing offsets related to the broadcast program and the CPE later uses them to reference to the interactive content database and retrieve interactive content. In another embodiment, the content database may return an interactive application, an interactive application identifier, or an Internet address (URL) that leads to or controls an interactive application or list of timing offset objects as well as other data. In one embodiment the content database containing the interactive applications and interactive content is located separately from the timing ofsets database. Interactive content includes interactive applications, elements of interactive applications, and other interactive content, but for ease of reference, the terms "interactive content" and "interactive application" shall be used interchangeably to cover all forms of interactivity for broadcast programs that are described herein or equivalent to those disclosed.

Timing offsets generally are synchrony-oriented data such as broadcast program start and stop times or other timing data useful to the interactive applications. Start and end times for broadcast programs listed on the EPG are an example of an absolute timing offset. These times help an interactive application server known when to execute and terminate batch interactive applications, or when to execute and terminate individual interactive applications that commence execution at the start of a broadcast program, so that each element of the interactive application associated with the broadcast program will temporally coincide with appropriate triggering events in the broadcast program.

In one embodiment, synchrony between multiple individual interactive applications or events associated with a broadcast program and the broadcast program is maintained using relative timing offsets. In one embodiment, a list of timing offset objects is associated with a broadcast program, each timing offset object containing: a timing offset relative to the start of the program, an application object (such as an interactive application), and an action to take on the application object (such as execute, execute for a duration, suspend, resume, or terminate). Timing offset objects trigger the processor that executes interactive content to initiate time-sensitive elements of the interactive content so that the elements will coincide with events taking place in the broadcast program. For example, the timing offset objects may contain time offsets for the start and end times of each commercial; likewise, it is desired to synchronize elements in the interactive application (e.g. dialog boxes or voting buttons) with events in the broadcast program (e.g. game show questions), the timing offsets for such events may also be encoded. For instance, when a game show host is about to reveal the answer, a timing offset triggers termination of the "viewer answer window" interactive application, and the interactive window in which the viewer could have responded is removed from display. As another example, when a commercial break starts in the middle of a broadcast program, the interactive application associated with the broadcast program is triggered by a timing offset to suspend display, yet retain information the viewer will need when the program and the program's interactive application resume.

Timing offset objects may be retrieved on demand or downloaded ahead of time. Timing offset objects may contain simply a list of trigger times, relative to the start of a broadcast program, or as described above, they may contain trigger times in addition to indicators of what elements of the interactive application are to be executed, terminated, run for a duration, suspended, resumed, or triggered.

The primary functions described above as being performed by a viewer's CPE may also be performed by other devices at different locations between the national broadcaster and the CPE. For example, in one embodiment an application server at the local network facility or cable head end uses the EPG to coordinate time, channel and location information with a program identifier. The application server then uses the timing offset database to associate the program identifier with a timing offset object or list of timing offset objects which contains actions to take on interactive content at appropriate times during the broadcast program. The application server may then retrieve the interactive content from an interactive content database and insert it into the broadcast for reception by the viewer's reception equipment which will then display the interactive content. In one embodiment, the content database itself is located at the server at the local network.

These functions may also be divided between the application server and the CPE. For instance, in one embodiment, the application server uses the EPG to coordinate time, channel and location information with a program identifier, and then uses the timing offset database to associate the program identifier with a timing offset object. The application server than inserts the timing offset object, or part thereof, into the broadcast stream for reception by the CPE. The CPE uses data from the received timing offset to reference the interactive content database and retrieve interactive content.

Finally, in any of the above embodiments, the interactive content is displayed (or otherwise provided) in synchrony with the broadcast program. Such display may be accomplished by the CPE. In one embodiment the CPE displays the interactive content after the CPE has itself retrieved the interactive content through the EPG and timing offsets and acted upon it. In another embodiment the CPE displays the interactive content after having received it in the broadcast stream from the local network facility. In another embodiment the CPE displays the interactive content after having received the timing offsets in the broadcast stream, having used them to retrieve the interactive content, and then having acted upon the interactive content. In one embodiment, synchrony is controlled with reference to the local system clock in the CPE, as further described below. In one embodiment, this display of the interactive content overlaps the broadcast program visually; in another the display of the interactive content is on a separate channel or CPE.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

I System Architecture

Figure 3:
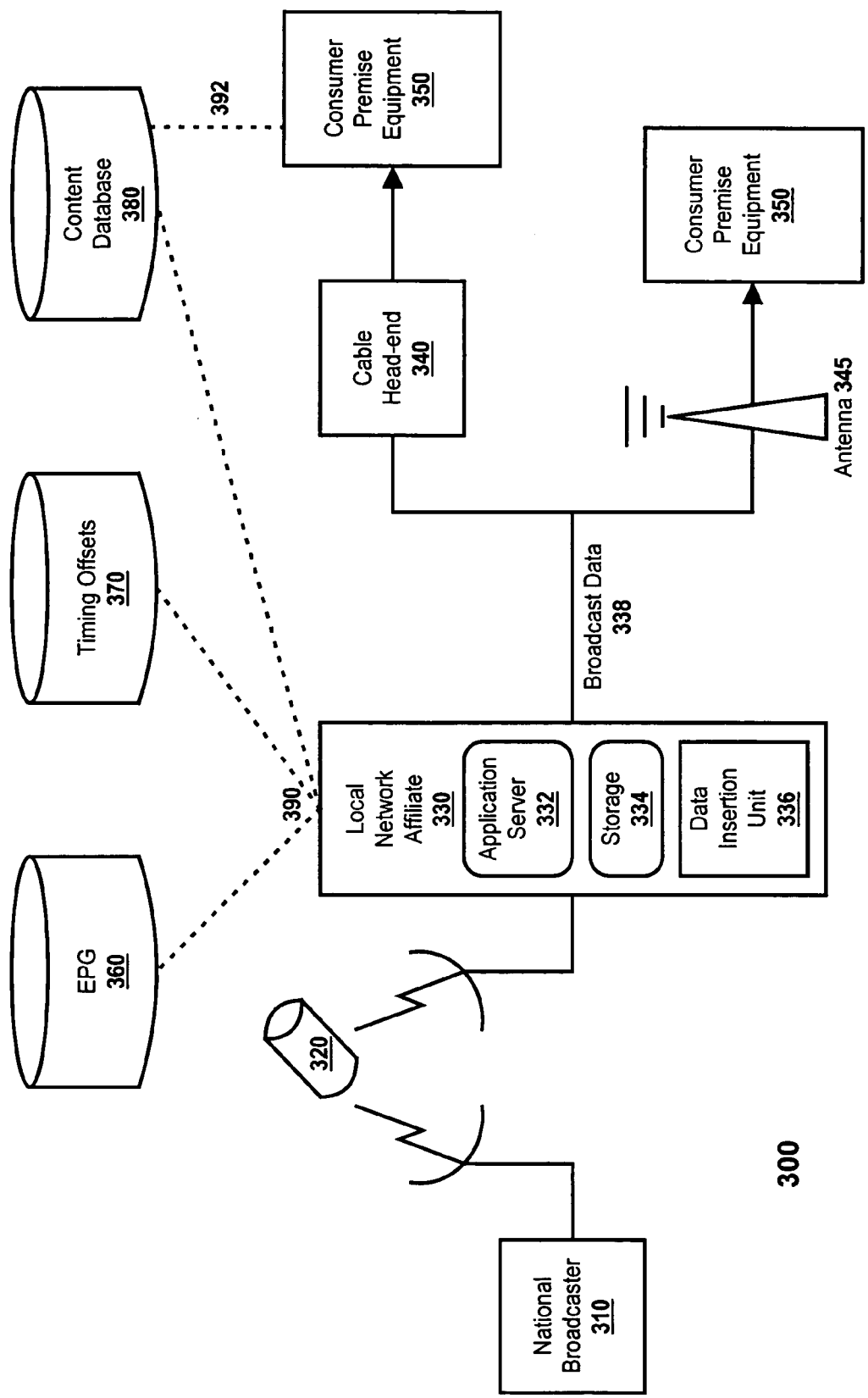
FIG. 3 is an illustration of the overall system wherein the primary processing is done of the local network affiliate.

Referring now to FIG. 3, there is shown an illustration of one embodiment of a system in accordance with the present invention. It will be appreciated that the system illustrated in FIG. 3 may be incorporated in to larger, more complex systems while still providing the features and benefits of the invention.

Generally, system 300 includes one or more national broadcasters 310, means of transmission from national broadcasters to local broadcasters such as satellite 320, a plurality of local broadcasters typically including local network affiliates 330, and a transmitter 340/345. In one embodiment, this transmitter is a conventional cable head end 340, and in other embodiments the transmitter is a conventional television broadcast transmitter 345 or a high-definition television digital transmitter. Consumer premise devises or equipment (CPEs) 350 are remotely distributed in viewer's homes, offices, and the like. BRs 350 include, but are not limited to, televisions, set top boxes, personal computers, and satellite receivers. The person or persons receiving the programs are referred to a "subscribers" or "viewers." Implementation of the present invention in other installations is certainly feasible.

The system 300 cooperates with multiple national broadcasters 310 and multiple local network affiliates 330. As used herein, "broadcasting" is transmitting a program to one or more viewers. Transmission of the program takes place on any broadcast signal (including a cablecast or internet multicast signal). A "broadcast" is such a transmission. A "program" or "broadcast program" is a discrete segment of a broadcast. Thus, as defined herein, programs include television shows, commercials, public service announcements, pay-per-view events, and the like. Broadcasters include television networks, both national and local, as well as advertisers who prepare and transmit commercials, pay-per-view providers, cable networks, and the like.

The local network affiliate 330 is a broadcaster and may receive broadcast programs from the national broadcaster 310 and forward those programs to viewers. The local network affiliate 330 may forward such broadcast programs with or without delay ("timeshifting"), with or without the commercials or with different commercials, and with or without the VBI portion as broadcast by the national broadcaster. The local network affiliate 330 may also broadcast other programs not received from the national broadcaster.

The local affiliate 330 may utilize an application server 332, storage 334, and a data insertion unit 336. The application server 332 is preferably a computer system executing one or more software programs providing the functionality described herein. A suitable application server is the Wink Application server, from Wink Communications, Inc. of Alameda, Calif. In one embodiment, the application server 332 or coupled storage 334 contains one or more EPG databases 360, the timing offsets database 370, and/or the interactive content database 380. In another embodiment these databases are located externally, such as on a remote server on the internet, so that information can be searched for and retrieved from them by the application server 332 by a secure network link or any other transmission media 390 ("remote lookup"). In yet another embodiment, contents of these databases are provided through e-mail or FTP upon request by the application server 332 or in regular or as-required installments.

The EPG database 360 coordinates geographic location, local time, and channel information with a corresponding broadcast programs. The application server 332 either implicitly or explicitly supplies the EPG database 360 with a time and a geographic location (or broadcast source such as a cable or other system), and explicitly with a channel, and the EPG database 360 preferably returns an identifier of which broadcast program is being or will be viewed by viewers at that channel, time, and location. In one embodiment, this identifier is a program ID such as the program identification codes used by broadcast sources. In other embodiments, the EPG database 360 alternatively or additionally returns a list of (or a pointer to a list of) timing offset objects, an interactive application, an interactive application identifier, or an Internet address (URL) that leads to or controls interactive applications and interactive content. In another embodiment, the EPG database 360 returns a list of interactive applications to pre-fetch for later use.

The EPG database 360 may be compiled by any source including the local network affiliate, the national broadcaster in conjunction with its local network affiliates, or a third party such as TV Guide® that collects broadcast scheduling information from local affiliates and cable broadcasters nationwide. The EPG database 360 may be broadcast to and stored on the application server 332 or in storage 334 coupled to the server 332 for quicker access than a remote lookup could provide.

Figure 7:
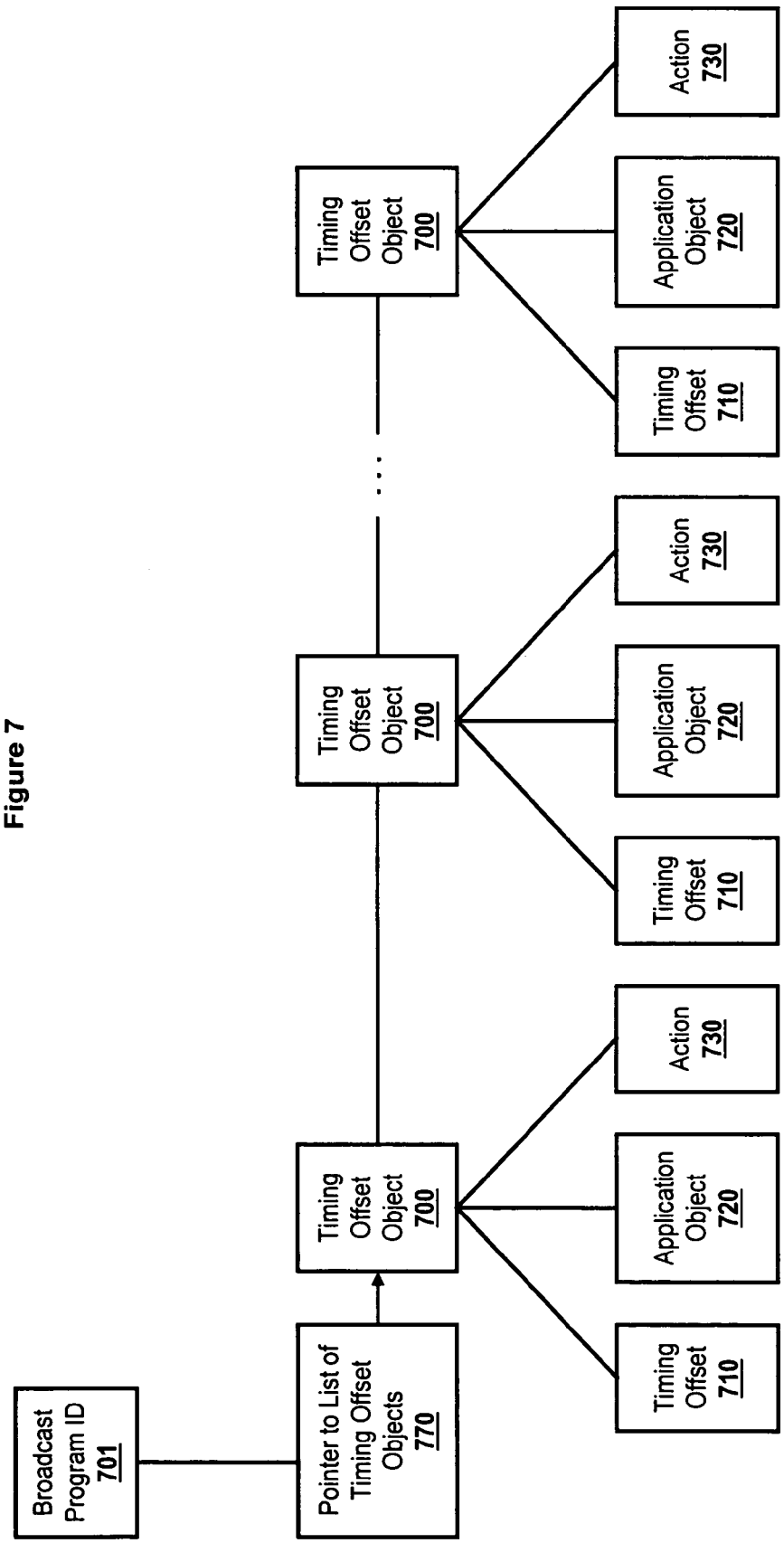
FIG. 7 is a diagram of a timing offset object list.

Referring now to FIGS. 3 and 7, the timing offsets database 370 preferably contains lists or pointers to lists 770 of timing offset objects, where each list is associated with at least one broadcast program ID 701. Each list of timing offset objects contains one or more timing offset objects 700, each timing offset object preferably containing three pieces of data: a timing offset 710, an application object 720, and an action 730. In alternative embodiments, each timing offset object in the list contains only one or two of these pieces of data. For example, in one embodiment, each timing offset object contains just the application object 720, in which case the list of timing offset objects reduces to a list of application objects where each application object is either interactive content or a reference to interactive content. Such a list of application objects is well suited for pre-fetching interactive applications at a time prior to the running of the application, and then acting upon the pre-fetched applications according to triggers later received in the broadcast signal (or from a remote server or user input) specifying some action at some time. In another embodiment, if the timing offset object includes an action 730 and that action is to execute for a duration, the timing offset contains a fourth piece of data specifying the duration.

In one embodiment, the timing offset 710 is a time, in minutes, seconds, or portions of minutes or seconds. Alternatively, other time bases may be used. In one embodiments, the timing offset 710 is measured from the beginning of a broadcast program. In an alternate embodiment the timing offset 710 is absolute (e.g. 8:06 pm). The application object 720 may be an identifier of interactive content or the interactive content itself. Interactive content includes interactive applications, elements of interactive applications, and other interactive content. Identifiers of interactive content include application identifiers, such as UIC identifiers of ICAP applications, described in U.S. Pat. No. 5,689,799, which is entitled "Method and Apparatus for Routing Confidential Information," and is hereby incorporated by reference herein. Identifiers of interactive content also include pointers to network sources of interactive content such as URLs. In one embodiment the application object is a URL and the interactive content is retrieved from an Internet address such as a Web sit corresponding to the URL application object. The name "application object" is not intended to restrict implementation in any way including but not limited to any particular type of data structure or database object. Instead, "application object" as used herein means identifiers of interactive content or interactive content itself as described herein or equivalent to those disclosed, including but not limited to text, graphics, images, URLs, HTML, DHTML, JAVA, XML, and ATVEF. The action 730 is an action to be performed on the application object at the relative time of the timing offset. Actions include but are not limited to starting, stopping, suspending, resuming, triggering, and running for a duration. Examples of triggering include but are not limited to initiating execution of a command script, changing resources, changing forms or other displays in the midst of an interactive application, aching interactive content, and storing usage data. Thus, in the preferred embodiment, a broadcast program is associated through its identifier 701 with at least one list (or at least one pointer to a list 770) of timing offset objects 700 in the timing offset database 370. These timing offsets objects 700 each instruct a processor to take an action 730 on an application object 720 at a timing offset 710 relative to the start of the broadcast program. The name "timing offset object" is not intended to restrict implementation in ay way including but not limited to any particular type data structure or database object. Instead, "timing offset object" as used herein means a collection of timing information (such as a timing offset, an application object, and an action) or references to such information or portions of such information as described herein or equivalent to those disclosed.

Figure 8:
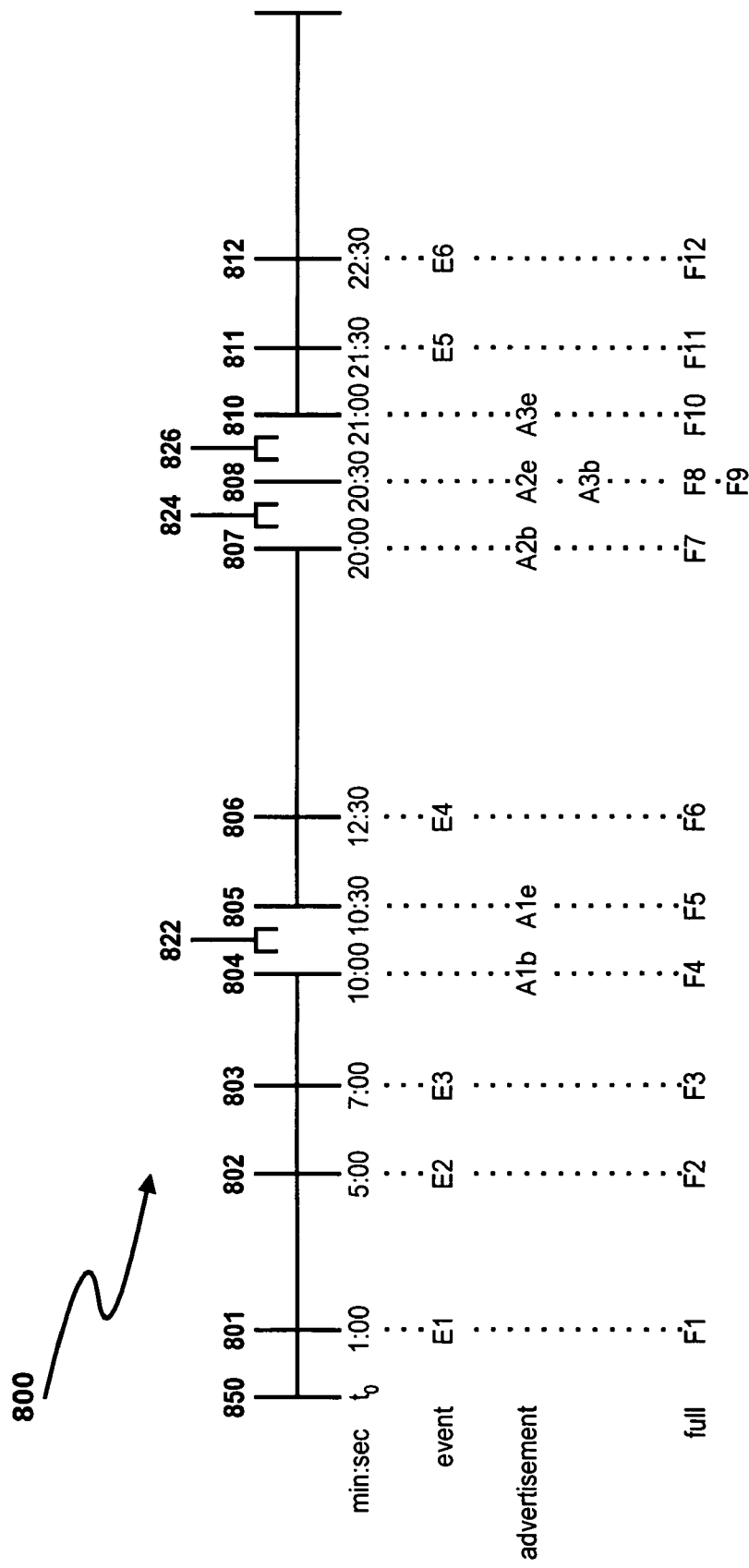
FIG. 8 is an example timeline with timing offsets in a broadcast program.

Referring now to FIGS. 7 and 8 and Table 1 (below), in one embodiment, lists of timing offset objects 700/800 may be of the following types; broadcast program only ("event"), advertising only ("advertising"), or both ("full"). For event timing offset objects, each timing offset 710 refers to an interactive element that will happen during the broadcast program at a time relative to a start 850 of the broadcast program as that program would play without any breaks, such as breaks for commercials.

In the example here, E1 is an event timing offset 801 that takes place 1 minute into the broadcast program. E1 has a timing offset value of 1 minute. Because there are no breaks in the broadcast program before 1 minute, the viewer will experience the interactive content corresponding to timing offset E1 1 minute after the program starts. E4 is an event timing offset that takes place 12 minutes into the broadcast program. E4 has a timing offset value of 12 minutes. Because there is a 30 second commercial break 822 at 10 minutes into the broadcast program, the viewer will experience the interactive content corresponding to timing offset 34 12 minutes 30 seconds after the start of the program. If the broadcast program were to start at 20:00:00 (8:00 pm), the viewer would experience E4 at 20:12:30. Thus event timing offset objects exist without regards to timing for advertising breaks. In FIG. 8 other exemplary event timing offsets 802, 803, 804, 805, 806, 807, 808, 810, 811, and 812 are shown at 5 minutes, 7 minutes, 10 minutes, 10 minutes, 30 seconds, 12 minutes 30 seconds, 20 minutes, 20 minutes 30 seconds, 21 minutes, 21 minutes 30 seconds, and 22 minutes 30 seconds respectively.

For advertising timing offset objects, each timing offset 710 refers to an interactive element that will happen during a break in the broadcast program at a time relative to the start of the broadcast program. In the example of Table 1 and FIG. 8, A2b is an advertising timing offset that takes place 20 minutes into the broadcast program. A2b signifies the beginning 807 of the second commercial break 824, A2b has a timing offset value of 20 minutes. A viewer would experience the interactive content corresponding to timing offset A2b at 20 minutes after the start of the program. A2e signifies the end 808 of the second commercial break and has a value of 20 minutes 30 seconds. If the broadcast program were to start at 20:00:00 (8:00 pm), the viewer would experience the end, triggered by timing offset A2e, of the interactive content corresponding to the commercial 824 at 20:20:30. Advertising timing offsets exist without regards to the specific interactive events that happen during the broadcast program, they refer only to breaks in the broadcast program. An example of another commercial break is shown at 826.

For full timing offset objects, the list of timing offset objects includes the timing offsets for both the broadcast program and the advertisements. In the example at Table 2 and FIG. 8, F4, F5, and F6 are full timing offsets 804, 805, and 806 respectively that take place 10 minutes, 10 minutes 30 seconds, and 12 minutes 30 seconds respectively into the broadcast program, and represent the start of the first commercial (F4), the end of the first commercial (F5), and the fourth element of interactive content in the broadcast program (F6) respectively. The viewer would experience the respective beginnings and endings of interactive content corresponding to F4, F5, and F6 at 10 minutes, 10 minutes 30 seconds, and 12 minutes 30 seconds respectively into the broadcast program. In one embodiment, advertising and event timing offsets arrive separately and are merged together to produce the equivalent of full timing offsets. In another embodiment all of the timing offsets are full timing offsets. In yet another embodiment, timing offsets can be mixed and of any type.

TABLE 1

|  | Relative Timing Offset 710 Min:sec | Time viewer sees it occur relative to start of Broadcast Program (min:sec) | Absolute Timing Offset 710 (hr:min:sec) |
| --- | --- | --- | --- |
| E1 | 1:00 | 1:00 |  |
| E2 | 5:00 | 5:00 |  |
| E3 | 7:00 | 7:00 |  |
| E4 | 12:00 | 12:30 |  |
| E5 | 20:00 | 21:30 |  |
| E6 | 21:00 | 22:30 |  |
| A1b | 10:00 | 10:00 | 20:10:00 |
| A1e | 10:30 | 10:30 | 20:10:30 |
| A2b | 20:00 | 20:00 | 20:20:00 |
| A2e | 20:30 | 20:30 | 20:20:30 |
| A3b | 20:30 | 20:30 | 20:20:30 |
| A3e | 21:00 | 21:00 | 20:21:00 | b = beginning of break; e = end of break

TABLE 2

|  | Relative Timing Offset 710 Min:sec | Time viewer sees it occur relative to start of Broadcast Program (min:sec) | Absolute Timing Offset 710 (hr:min:sec) |
| --- | --- | --- | --- |
| F1 | 1:00 | 1:00 | 20:01:00 |
| F2 | 5:00 | 5:00 | 20:05:00 |
| F3 | 7:00 | 7:00 | 20:07:00 |
| F4 | 10:00 | 10:00 | 20:10:00 |
| F5 | 10:30 | 10:30 | 20:10:30 |
| F6 | 12:30 | 12:30 | 20:12:30 |
| F7 | 20:00 | 20:00 | 20:20:00 |
| F8 | 20:30 | 20:30 | 20:20:30 |
| F9 | 20:30 | 20:30 | 20:20:30 |
| F10 | 21:00 | 21:00 | 20:21:00 |
| F11 | 21:30 | 21:30 | 20:21:30 |
| F12 | 22:30 | 22:30 | 20:22:30 |

In other embodiments, the timing offset database 370 relates timing offset objects or lists of timing offset objects to interactive applications or their identifiers, or URLs or other pointers, which are in turn related to broadcast programs, as opposed to relating the timing offset objects and lists thereof directly to broadcast programs. Timing offsets serve as input to the present invention and may come from any number of different sources such as a producer of a broadcast program, or a broadcaster playlist generated for satellite broadcast with commercials or gaps inserted for commercials. In one embodiment, the timing offsets, the interactive content, and the application server are all provided by one supplier or a coalition of suppliers.

Referring again to FIG. 3, the interactive content database 380 stores interactive applications or other forms of interactivity that will be broadcast to various remotely distributed BRs 350. Interactive applications may be added to the interactive content database 380 by a broadcaster or other program or content supplier and may be transmitted to the database 380 by a secure network link or other transmission media. Each interactive application in the interactive content database 380 preferably has a unique interactive application identification code by which it may be identified. Fields within the interactive content database 380 could also associated interactive applications with, for example, a broadcaster, network, URL, or program.

After determining a broadcast program through the EPG and associating the broadcast program with an interactive application, preferably through a timing offset object, the application server 332 retrieves the associated interactive application from the content database 380. In another embodiment, after determining a broadcast program, and from it an application object, the application server 332 retrieves, from the content database 380, a URL instead of the interactive content itself, and then retrieves the interactive content from the Internet or other network at that URL.

In one embodiment of the present invention, the interactive applications stored in the interactive content database 380 are described by a compact communications protocol. The compact protocol is designed to broadcast a compact set of information and commands among the system components in an efficient manner, thereby allowing the use of low bandwidth transports such as the vertical blanking interval ("VBI"). While one embodiment of the present invention uses the compact protocol described herein (see U.S. Pat. No. 5,689,799), interactive applications may be described by other protocols, including for example, the Hypertext Markup Language ("HTML"), Extended Markup Language ("XML"), SUN MICROSYSTEMS INC.'s JAVA language, or the HTML-based interactive television protocol ATVEF. A detailed description of one compact protocol suitable for interactive applications, including supported definitions, scripts, and commands, is described in U.S. Pat. No. 5,689,799. The interactive applications are themselves software products comprising executable code and data, which configures and controls the operation of a CPE so that the CPE can provide interactivity to the viewer, as further described below.

There may be a plurality of application servers 332, with each application server 332 serving a particular geographic area, set of broadcasters or set of subscribers. In one embodiment each application server 332 is identified by a unique server identification code.

The application server 332 formats a retrieved interactive application, if necessary, and otherwise prepares it for insertion into a broadcast signal. The application server 332 passes the interactive application to a transport (medium) to incorporate the interactive application into the broadcast data 338 concurrent with the broadcast of the program. The invention is transport independent, but examples of possible transports include a concurrent digital MPEG signal, HTTP over TCP/IP, or an analog VBI or radio frequency VBI. In one embodiment, where the transport is a digital broadcast, an MPEG inserter would be used convey the interactive application. In one embodiment, the transport is the analog VBI and a data insertion unit ("DIU") 336 is used to insert commands and data, output by the application server 332, into the datastream. This datastream is broadcast to the BRs 350 instructing to them, for example, to trigger elements of interactive applications or to start, stop, cancel, suspend, or resume interactive applications currently being received or already resident in memory in the BRs 350.

Continuing with the example wherein the transport is the analog VBI, the DIU 336 receives the interactive application or commands from the application server 332 and the broadcast signal, or feed, carrying the program corresponding to the interactive application. The broadcast feed may be received from the broadcast program sources, the broadcaster directly, or, in the case where the broadcaster does not provide the feed, from a third party such as a network, cable operator, or local television station. The application server 332 converts the interactive application and commands into a format suitable for insertion into the broadcaster feed and transmission therewith as broadcast data 338. The DIU 336 may receive feeds from multiple broadcasters and can insert a separate interactive application into each feed. Likewise, the DIU 336 can simultaneously insert a separate interactive application into multiple channels from the same, or different, broadcasters.

The DIU 336 inserts the broadcast data 338 containing the interactive applications, commands, and broadcast programs into the broadcast medium. In an alternative embodiment, broadcast data contains timing offset objects or elements of timing offset objects (such as application objects) with which the CPE 350 references the interactive content database 380 to retrieve interactive applications. In one embodiment, the DIU 336 uses conventional methods to insert data defining an interactive application into the VBI of the broadcast feed. The North American Broadcast Teletext Standard (EIA-306), defines the methods and protocols for sending data in one or more lines of the VBI. However, a wide variety of other transport mechanisms are available, including those that broadcast the interactive application separately from the television program.

In one embodiment, error checking or error correcting codes such as Hamming codes are inserted with the data. In one embodiment, the DIU 336 translates the data into a Hamming code, and in another embodiment, the data received by the DIU 336 from the application server 332 is already encoded.

The DIU 336 is coupled to a transmitter for transmitting the broadcast feed, including any inserted interactive applications or commands from the application server 332. In one embodiment, the transmitter is a conventional cable system head-end 340 amplifier. In yet other embodiments, the transmitter is a conventional television broadcast transmitter 345 or a high-definition television digital transmitter. Still in other embodiments, the transmitter may transmit the broadcast data over a WAN connection, the Internet, or other public/private networks.

Regardless of transmission method and insertion time, the broadcast data 338, including the interactive application, is received by a subscriber's CPE 350. Although only two BRs 350 are illustrated in FIG. 3, it is understood that in a typical embodiment there are hundreds or thousands of BRs 350 receiving the broadcast data 338 and responding as described herein. In a typical embodiment, the CPE 350 is a television set-top box receiving the data 338 via a coaxial cable. Additionally, the CPE 350 may be integrated into the television. Moreover, other CPEs, including a broadcast receiver such as an NTSC broadcast receiver, a high-definition television digital receiver, a video cassette recorder, or an FM radio receiver can also be used.

It should be noted that the application server 332 may also serve other types of data, separate from or in addition to interactive applications. For example, the application server 332 may serve data such as computer programs or audio/video data. The application server 332 may also provide data, forms, codes, or triggers to interactive applications previously transmitted to the CPEs.

The application server 332 may also serve hypermedia data, such as text, graphics, images, uniform resource locators (URLs), uniform resource identifiers (URIs), HTML, XML, ATVEF, JAVA applets, or other types or formats of data.

In another embodiment, the application server 332, storage 334, and data insertion unit 336 are located at the cable head-on 340 as opposed to at the local network affiliate 330. The functionality and data flow in this embodiment mimics that of the aforementioned local network affiliate embodiment.

Two preferred embodiments are distinguished by locus of control. In the first preferred embodiment, the application server 332 uses the EPG database 360 in conjunction with the timing offsets database 370 to determine which interactive applications should be broadcast on a particular channel in a particular location at a particular time, retrieves the interactive applications corresponding to the particular channel, location, and time or program identification code from the interactive content database 380, and prepares the interactive applications for broadcast, as described above. In the second preferred embodiment, it is the CPE 350 instead of the application server 332, that performs these functions; i.e. it is the CPE 350 that performs the EPG 360 lookup and subsequent timing offsets database 370 lookup, as well as the retrieval of the interactive application from the interactive content database 380. In another embodiment, the EPG 360 lookup and the subsequent timing offsets database 370 lookups are performed by the application server 332, which feeds the timing offset objects to the data insertion unit 336 to broadcast to the CPE 350 which retrieves the interactive applications from the interactive content database 380 and acts upon them. Thus it can be seen that the present invention does not limit the location at which determinations regarding the interactive content are made, or actions regarding the interactive content are taken, or the specific hardware or software apparatus that makes these determinations, or takes these actions.

II Consumer Premise Equipment

Figure 1:
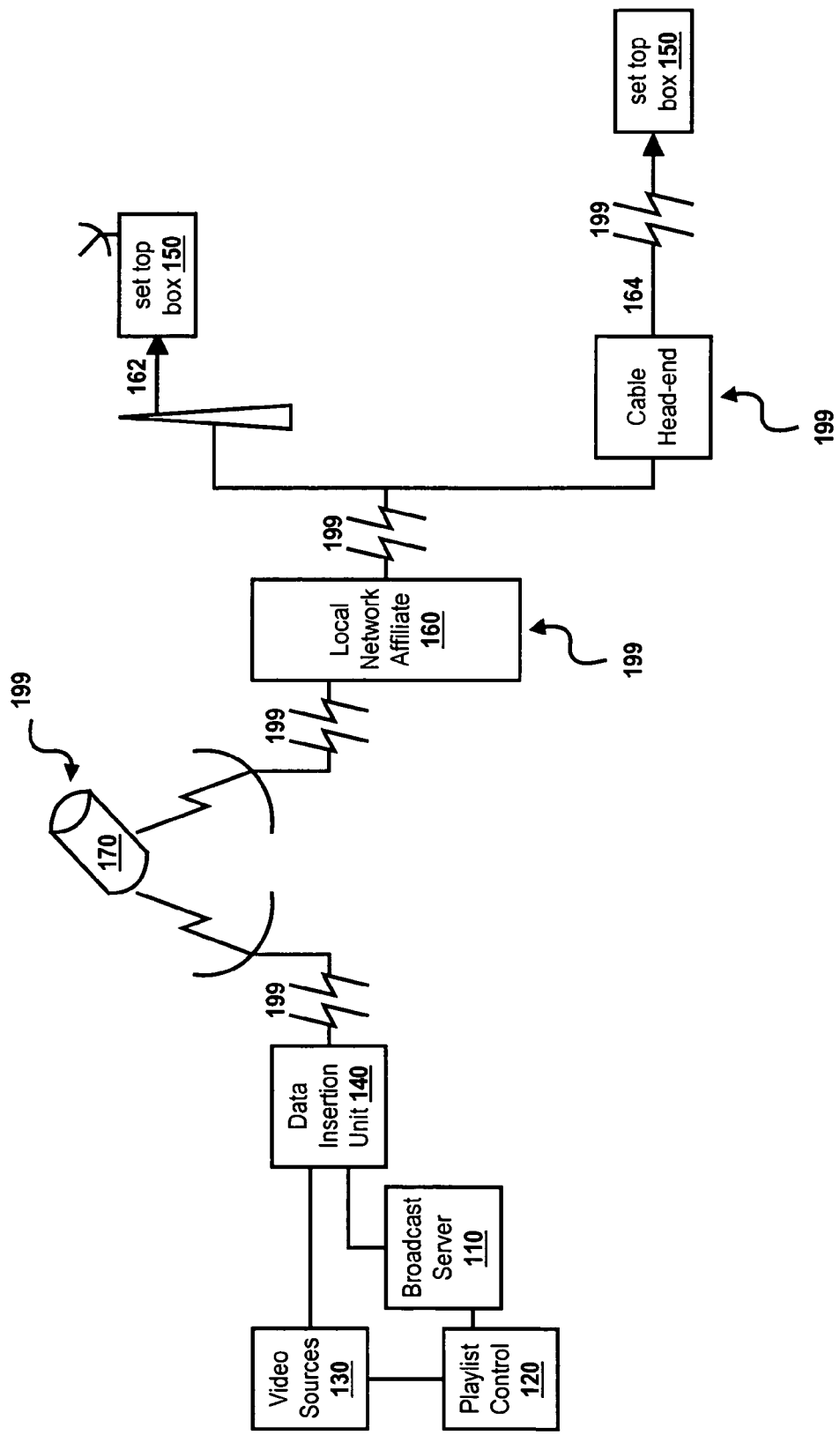
FIG. 1 is an illustration of the prior art with locations of potential corruption to the signal highlighted.
Figure 2:
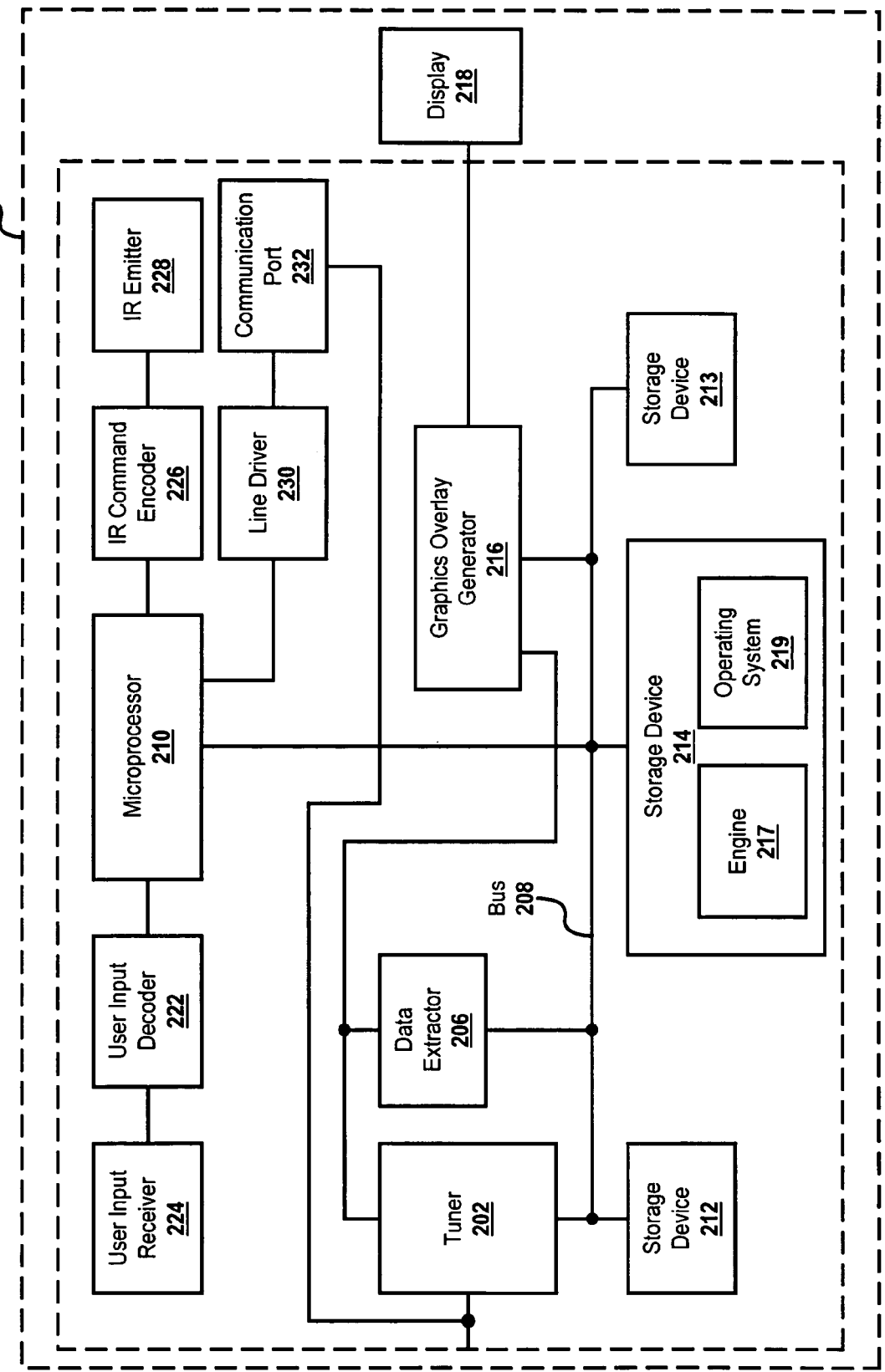
FIG. 2 is a detailed illustration of the CPE.

FIG. 2, and 3 illustrate the consumer premise equipment (CPE) 350 according to an embodiment of the present invention. In one embodiment, the CPE 350 is the Scientific Atlanta Explorer CATV set-top decoder, the Direct TV IRD satellite receiver, or a similar decoding device or broadcast receiver. In other embodiments CPE 350 may be, but is not limited to a television, a personal computer, or a satellite or other receiver. The CPE 350 includes a tuner 202 for receiving the broadcast data 338. In one embodiment, the tuner 202 is a conventional cable television tuner. In other embodiments, the tuner is a television broadcast tuner, a FM radio tuner, a digital tuner, or some other form of tuner. In yet another embodiment, a personal computer with the appropriate hardware and software may function to display broadcast programs received over various types of transmission channels, including cable, the Internet, and satellite.

The embodiment illustrated in FIG. 2 shows a display 218, typically a television, coupled to the CPE 350.

The CPE 350 also includes a data extractor 206 (coupled to the tuner 202) for receiving the EPG, timing offsets, interactive application, or other data from the broadcast data 338 or from other external sources such as a server on a network. This information may be received on demand, as a constant stream, on an as-needed basis, or periodically. In one embodiment, the CPE 350 (using the data extractor 206 and tuner 202) extracts the interactive content from the inband broadcast data 338 in the VBI and provides it as interactivity to the viewer, while it extracts the EPG database from the out-of-band channel-independent data. In another embodiment, the CPE 350 extracts timing offset objects or elements of timing offset objects from the broadcast data 338 and communicatively couples 392 with the content database 380 via the data extractor 206 to retrieve and act on the appropriate interactive content and provide it as interactivity to the viewer. In yet another embodiment, the CPE 350 communicatively couples 490 with servers holding the EPG database 360, the timing offsets database 370, and the content database 380 via the data extractor 206 to determine, using the microprocessor 210, a broadcast program, timing offsets for the broadcast program, and interactive content associated with the broadcast program. After retrieving the determining interactive content, the CPE 350 then either acts upon it and provides it as interactivity to the viewer, or caches it until it is needed in conjunction with a broadcast program.

In one embodiment, the data extractor 206 is a conventional VBI inband data extraction circuit. In another embodiment, the data extractor 206 is a conventional modem. In yet another embodiment, the data extractor 206 can function as both of these. The data extractor 206 provides a serial bitstream containing the extracted interactive application onto a bus 208. The bus 208 is coupled to a microprocessor 210 which stores, via the bus 208, the extracted program ID, timing offsets, interactive application, or other interactive content into a first storage device 212 as instructed by a program stored in a second storage device 214. In one embodiment, the microprocessor 210 is coupled to the data extractor via the bus 208 and determines a program ID from the EPG database 360. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). A third storage device 213, which may be RAM or flash memory, is coupled to the microprocessor 210 to cache any or all of the full EPG database 360, the timing offsets database 370, and the interactive content database 380 if those are not stored externally and referenced through the data extractor 206. An advantage of flash memory is that software or data resident in the CPE 350 can be modified by a received interactive application. In one embodiment the third storage device 213 is used to store pre-fetched interactive applications.

In one embodiment, the CPE 350 also uses the data extractor 206 to extract a time signal from the broadcast data 338. The time signal indicates the current time using a standard timebase, such as Coordinated Universal Time ("UTC") or the subscriber's local time. In another embodiment, the CPE 350 has a real-time clock that is either set by the subscriber or the received time signal. Regardless, the CPE 350 preferably has access to the current time and, accordingly, can execute or control the execution of interactive content in synchrony with broadcast programs and can perform data stamping and timing functions.

The microprocessor 210 uses the program stored in the second storage device 214 and the timing offsets, interactive application, or other interactive content stored in the first storage device 212 to execute the interactive application and provide an output. The program stored in the second storage device 214 is preferably an execution engine 217 for executing and otherwise controlling interactive applications defined by various scripts, forms, definitions, timing offsets, and code and graphic resources. In one embodiment, the execution engine is additionally for retrieving information such as the broadcast program identifier from the EPG database 360, the timing offsets from the timing offsets database 370, and the interactive content from the interactive content database 380. A preferred execution engine is the Wink Engine provided by Wink Communications, Inc. of Alameda, Calif. The CPE 350 includes either as part of the execution engine 217, or the native operating system 219 also stored in the second storage device 214, timer functions that can be run as background processes to countdown from an input value, or equivalent timing specification.

The output from executing an interactive application is interactivity which may be, for example, a form presenting information or a menu to a television viewer or for receiving viewer input, or it may be a response, silent (not apparent to the viewer) or otherwise, containing CPE 350 or television usage data or indicating viewer preferences. For purposes of the present invention, the forms may present may variety of information, and take any variety of user responses. To this end, the CPE 350 preferably includes a graphics overlay generator 216 coupled to the bus 208 and driven by the interactive application, or other interactive content stored in the first storage device 212 and the program stored in the second storage device 214. The graphics overlay generator 216 generates a graphical display responsive to the interactive application. This graphical display is displayed on a display 218, typically a television, coupled to the CPE 350. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application, for example, to input data into a displayed form. In one embodiment, the microprocessor 210 is also coupled to a user input decoder 222 coupled to a user input receiver 224 to allow the user to communicate with the microprocessor 10 in order to respond to the interactive application. In one embodiment, the user input decoder 222 is a conventional infrared remote control decoder. The user input receiver 224 is preferably a conventional infrared receiver 224 with which the user may use a conventional hand-held remote control device.

In one embodiment, the microprocessor 210 is also coupled to an IR Command Encoder 226 coupled to an IR Emitter 228.

In one embodiment, the CPE 350 is a cable TV set-top decoder, connected to a cable system via a broadband coax cable. In this embodiment, line driver 230 is an RF modem which is capable of sending responses via the coax cable to the cable system head-end, typically using an out-of-band portion of the RF spectrum, and communications port 232 is a standard RF tap. In another embodiment, the CPE 350 is a television, VCR, or set-top in which line driver 230 is a standard telephone modem and communications port 232 is a standard RJ-11 jack.

III Using the EPG for Synchrony

A. Control by an application server at the local network affiliate or cable head end.

Figure 5:
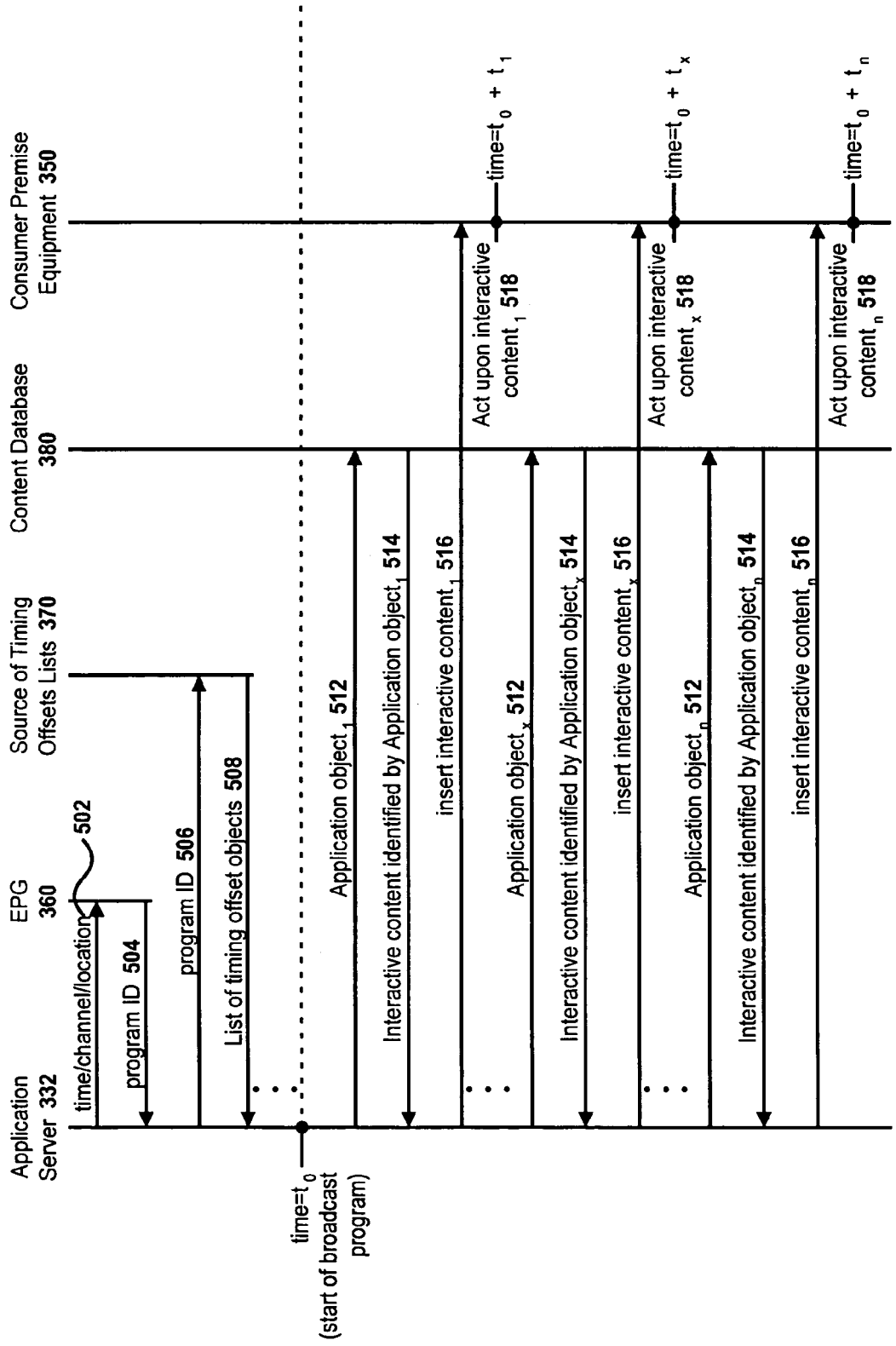
FIG. 5 is an event trace of the embodiment wherein the primary processing is done at the local network affiliate.

Referring now to FIGS. 3 and 5, FIG. 5 traces the events involved in one embodiment when an application server at the local network affiliate or cable head end controls use of the EPG to synchronize interactive content with an associated broadcast program. Time progresses in the trace from top to bottom. The horizontal arrows represent actions and information between the sources and actors listed across the top.

Generally, to determine which interactive applications are broadcast at the various times, channels, and so forth, the application server 332 provides the EPG data base 360 with time, channel, and location information as inputs. The EPG database 360 preferably returns a program ID. The application server 332 uses this information to identify and retrieve a corresponding list of timing offset objects from the timing offset database 370. Timing offset objects reference interactive applications, content, or elements of interactive applications or content (if any) from the content database 380 that is to accompany each broadcast program.

Specifically, the application server 332 determines what interactive content to act upon, how to act upon it, and when. To do so, it first provides 502 the EPG database 360 with a time, a channel, and a location. In one embodiment, the time is the current time. In another embodiment, the time and channel are some future time and any channel that could be watched at that time. The location is information that specifies where the viewer is located. In one embodiment this is a geographic location, such as a 9 digit zip code. In another embodiment it is an identifier of a specific cable or other broadcasting system that does not necessarily cover the same geographic area as a 9 digital zip code. In one embodiment, the location information is not provided explicitly, but is instead implicitly understood, such as when the only application server referencing a particular EPG database is the application server at a particular cable head end, so that the location information remains constant. Using at least the time, channel, and location information provided by the application server 332, the EPG database 360 returns 504 a program ID referencing the broadcast program being broadcast at the given time, channel, and location.

Next, the application server 332 sends 506 the program ID to a source of timing offset objects lists 370. Referring briefly also to FIG. 7, the source of timing offset objects lists 370, preferably a database of timing offsets lists, returns 508 a list of timing offset objects 770 or a reference thereto, each timing offset object 700 with a timing offset 710, an application object 720, and an action 730. There may be no pointer to a list of timing offset objects associated with a particular program ID, thus indicating there is no interactive content in the content database 380 for the broadcast program that relates to the program ID returned by the EPG database 360. If interactive content does exist for this program, then the list of timing offset objects includes one or more timing offset objects, the list referred to herein as $\{TOO_1 \ldots TOO_x \ldots TOO_n\}$, where $TOO_x$ contains a timing offset$_x$, and application object$_x$, and an action.

Time $t_0$ represents the start of the broadcast program. In this embodiment, all timing offsets are given in seconds relative to $t_0$. Thus, for example, $t_1$, the timing offset in $TOO_1$, may be 5.5, meaning that 5.5 seconds after the start of the broadcast program (real time $t_0+t_1$), the action$_1$ associated with timing offset object$_1$ should be undertaken upon the interactive content identified by application object$_1$. In another embodiment timing offsets are given in other time formats. In another embodiment they are given relative to the most recent timing offset. In yet another embodiment they are given in absolute time, such as :00: 05.5 pm.

To extract interactive content from the content database, identifying information from the application object$_1$ is provided 512 to the content database 380 by the application server 332 as input. This application object$_1$ is associated at the interactive content database 380 with interactive content to be acted upon in a manner dictated by action$_1$ at timing offset$_1$ (i.e. relative time $t_1$ which equal real time $t_0+t_1$). The interactive content database 380 then returns 514 the interactive content identified by the given application object$_1$. In another embodiment, the interactive content database 380 returns an internet URL or other pointer to network sources for interactive content and the application server 332 references that source to retrieve the interactive content on which to act. In another embodiment, the interactive content may already be included in the application object in which case there is no need to retrieve it from the content database.

The application server 332 then manipulates the retrieved interactive content according to action$_1$ and inserts 516 it into the broadcast stream via the DIU 336. In one embodiment this manipulation involves one or more of: passing the data straight through the DIU into the broadcast stream repeatedly for the duration of the interactive application's runtime; sending a command to suspend, resume, start, terminate, trigger, or run for a duration; and modifying the data to prepare it to be displayed or otherwise acted upon by a CPE 350. In one embodiment the inserted interactive content$_1$ sent from the application server 332 to the CPE 350 is described by definitions, scripts, and commands, which may be encoded and broadcast in any order. In one embodiment the application server performs the functions of retrieving the interactive content, manipulating it, and transporting it to the DIU using three corresponding software modules.

The CPE 350 listens for and receives the interactive content in time to act 518 upon it at time=timing offset$_1=t_0+t_1$. Acting upon the interactive content here means manipulating the behavior or display of interactive content, or otherwise providing the viewer with interactivity in accordance with definitions, scripts, and commands sent by the application server 332. In one embodiment acting upon the interactive content takes one of four forms: following command such as determining whether or not to make an application active, suspend it, or kill it; retrieving interactivity from an external server at a URL; silently running or visibly displaying forms of interactivity on the screen; and accepting and managing user input.

Steps 512, 514, 516, and 518 are then repeated for each timing offset object in $\{TOO_2 \ldots TOO_x \ldots TOO_n\}$.

In another embodiment, all of the interactive content$_{1 \ldots x \ldots n}$ is determined 512 and retrieved 514 before any of it is inserted. It is then inserted 516 as appropriate to be acted upon 518 at the appropriate times by the CPE 350.

In various embodiments, the EPG database 360, the timing offsets database 370, and the content database 380 may be located logically or physically together or separate and they may be located at or distributed amongst any of the local network affiliate 330, the cable head-end 340, the application server 332, the CPE 350, or a local or external source communicatively coupled to any of the above 390, 392. In another embodiment, the timing offset objects are dynamically provided through email, from a server on the Internet, or through network or modem connections to a remote server. In yet another embodiment, the timing offset objects are provided from the national broadcaster as identifiers embedded in the video or close captioned portion of the VBI.

B. Control by the Consumer Premise Equipment.

Figure 4:
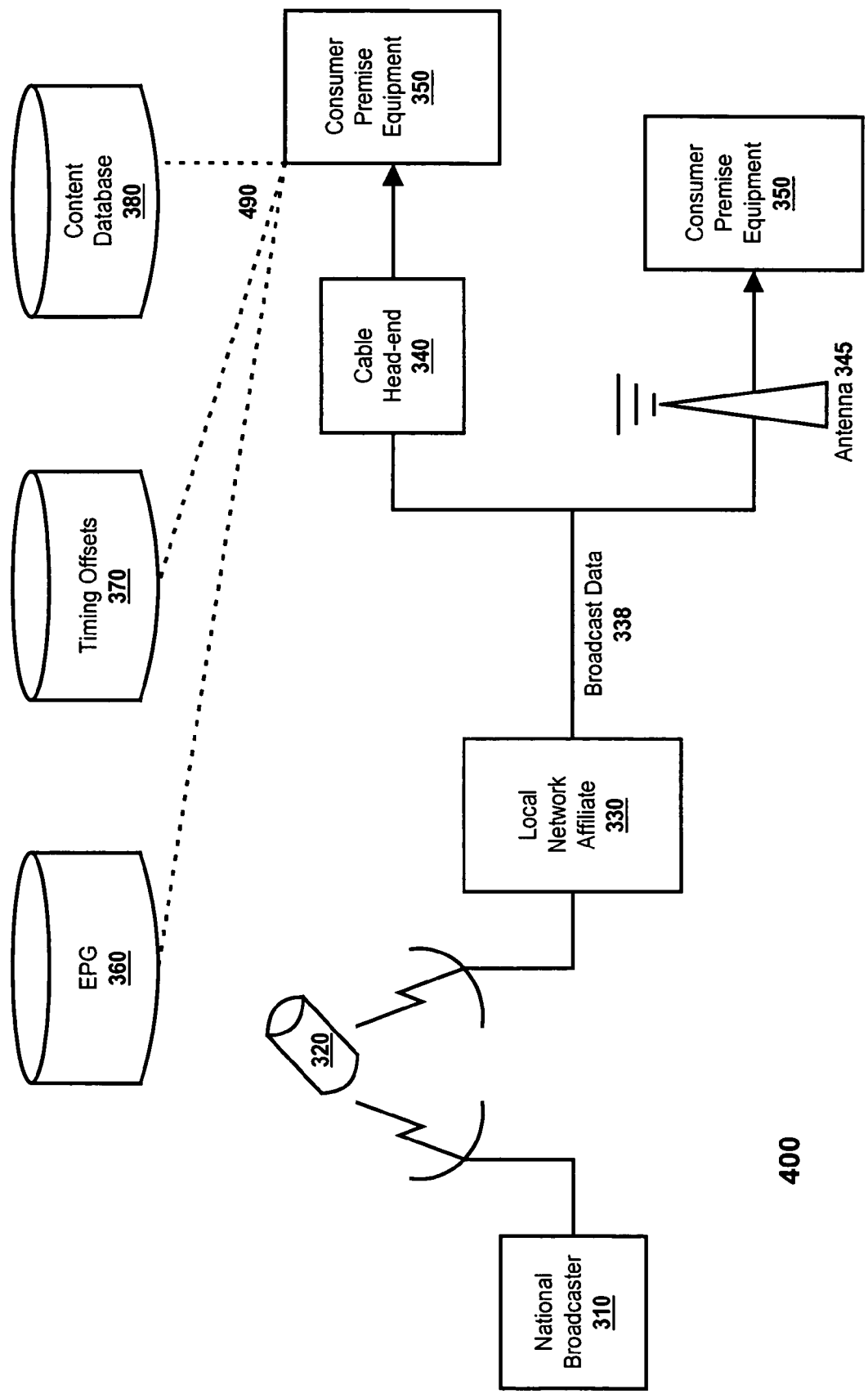
FIG. 4 is an illustration of the overall system wherein the primary processing is done at the CPE.
Figure 6:
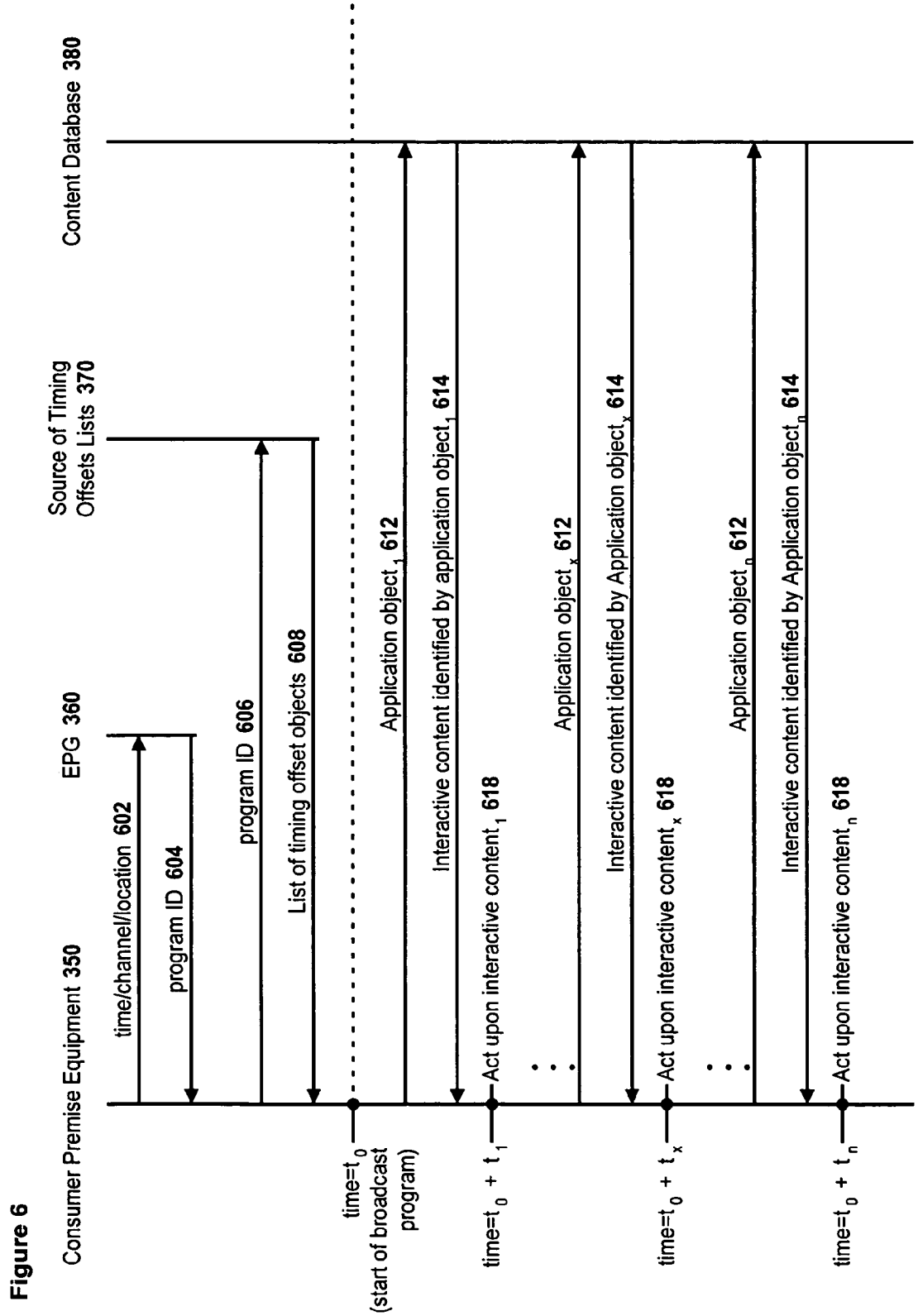
FIG. 6 is an event trace of the embodiment wherein the primary processing is done at the CPE.

Referring now to FIGS. 4 and 6, FIG. 6 traces the events involved when the consumer premise equipment (CPE) controls use of the EPG to synchronize interactive content with an associated broadcast program. In summary, the event race is similar to the trace described in section III A, above, with the exception of two primary differences. First, those actions described as taken by the application server 332 are instead taken by the CPE 350. Second, the interactive application does not need to be sent from an application server to the CPE because the CPE 350 itself references 602 the EPG database 360 using the time, channel, and location to retrieve 604 a program ID, references 606 the source of the timing offsets lists 370 using the program ID to retrieve 608 a list of timing offset objects, and references 612 the interactive content database 380 using the application object to retrieve 614 the interactive application on which to take action at timing offset. Thus, the interactive content need not be inserted into the broadcast stream and sent to the CPE 350 since it is already there. The CPE itself 350 then manipulates the retrieved interactive content according to the action specified in the timing offset object and formulates interactive content to provide to it the viewer as interactivity by the timing effect.

Specifically, the CPE 350 determines what interactive content to act upon, how to act upon it, and when. To do so, it first provides 602 the EPG database 360 with a time, a channel, and a location. In one embodiment, the time and channel are the current time and a current channel being watched by a viewer. In another embodiment, the time and channel are some future time and any channel that could be watched at that time. As before, the location is information that specifies where the viewer is located. In one embodiment, the location need not be explicitly provided, but may be implicit, for example if the viewer's own CPE were always at a constant location and were to reference a locally cached EPG, the location element would remain constant with every reference and would not need to be explicitly considered. Using at least the time, channel, and location information provided by the CPE 350, the EPG database 360 returns 604 a program ID referencing the broadcast program being broadcast at the given time, channel, and location.

Next, the CPE 350 sends 606 the program ID to a source of timing offset objects lists 370. Referring briefly also to FIG. 7, the source of timing offset objects lists 370 returns 608 a list of timing offset objects 770. As before, there may be no list of timing offset objects associated with a particular program ID, thus indicating there is no interactive content in the content database 380 for the broadcast program that relates to the program ID returned by the EPG database 360. If interactive content does exist for this program, then the list of timing offset objects includes one or more timing offset objects.

To extract interactive content from the content database, identifying information from the application object$_1$ is provided 512 to the content database 380 by the CPE 350 as input. This application object$_1$ is associated at the interactive content database 380 with interactive content to be acted upon in a manner dictated by action$_1$ at timing offset$_1$ (i.e. relative time $t_1$ which equals real time $t_0+t_1$). The interactive content database 380 then returns 614 the interactive content identified by the given application object$_1$. In another embodiment, the interactive content database 380 returns an internet URL or other pointer to network sources for interactive content and the CPE 350 references that source to retrieve the interactive content on which to act.

The CPE 350 then manipulates the retrieved interactive content according to action$_1$ and acts 618 upon it at time=timing offset$_1$=t$_0$+t$_1$. In one embodiment this manipulation involves either or both of: determining to suspend, resume, start, terminate, trigger the interactive content or an element thereof, or to run it for a duration; and modifying the data to prepare it to be displayed or otherwise acted upon to provide the viewer with interactivity. In one embodiment the CPE performs the functions of retrieving the interactive content and manipulating it using two corresponding software modules. In another embodiment, all of the interactive content$_{1\ldots x\ldots n}$ is determined 612, retrieved 614 (pre-fetched), and stored (pre-cached) before any of it is acted upon 618 at the appropriate times by the CPE 350. In one embodiment the CPE 350 receives triggers from the national or local broadcaster or the local cable affiliate at the appropriate times, triggering the CPE to manipulate, display, or otherwise act upon 618 the pre-fetched, pre-cached interactive content.

Steps 612, 614, and 618 are then repeated for each timing offset object in $\{TOO_2 \ldots TOO_x \ldots TOO_n\}$.

In various embodiments, the EPG database 360, the timing offsets database 370, and the content database 380 may be located locally or physically together or separate and they may be located at or distributed amongst any of the local network affiliate 330, the cable head-end 340, the CPE 350, or a local or external source communicatively coupled to any of the above 490. In another embodiment, the timing offset objects are dynamically provided through email, from a server on the Internet, or through network or modem connections to a remote server. In yet another embodiment, the timing offset objects are provided from the national broadcaster as identifiers embedded in the video or close captioned portion of the VBI.

As will be understood by those familiar with the art, the invention may be embodied in other specific forms without departing from the spirit or essential characteristics thereof. For example, databases such as the EPG, the timing offsets database, and the content database may be found locally or stored externally in fragments, in whole, or in combination with each other or other unrelated information. Also, various computers in any number of locations along the path from the national broadcaster to the CPE may take actions upon the interactive content. The actions that can be taken include those specified herein, but also include any number of other possibilities. Accordingly, the disclosure of the present invention is intended to be illustrative, but not limiting, of the scope of the invention, which is set forth in the following claims.

What is claimed is:

1. A computer implemented method of controlling a broadcast and reception of an interactive application, comprising:
   determining, using an electronic program guide, an interactive application associated with a broadcast program;
   controlling the interactive application to maintain synchrony with a display of the broadcast program;
   determining timing offsets associated with the broadcast program; and where
   controlling the interactive application to maintain synchrony with the display of the broadcast program is done in accordance with the timing offsets,
   wherein determining timing offsets associated with the broadcast program comprises receiving the timing offsets associated with the broadcast program from an external source.
   wherein the external source is a remote server, and receiving the timing offsets comprises: receiving an email containing the timing offsets via network connection from the remote server.

2. The computer implemented method of claim 1 further comprising:
   providing
      timing information of a broadcast program, and
      channel information of the broadcast program,
   as inputs to the electronic program guide, to determine the broadcast program; and
   determining the timing offsets associated with the determined broadcast program.

3. The computer implemented method of claim 2 further comprising:
   providing
      location information of a broadcaster of the broadcast program as the input to the electronic program guide, to determine the broadcast program.

4. The computer implemented method of claim 1 further comprising an action to take with regards to the interactive application, wherein the action to take is one of starting, running for a duration, stopping, suspending, resuming, or triggering the interactive application or an element of the interactive application.

5. The computer implemented method of claim 1 wherein a URL is associated with the interactive application the method further comprising:
   retrieving interactive content from a server on the Internet referenced by the URL; and
   performing an action on the retrieved interactive content.

6. The method of claim 1 wherein determining, using an electronic program guide, an interactive application associated with a broadcast program comprises:
   determining from the electronic program guide, a program identifier; and
   determining from the program identifier, the interactive application associated with the broadcast program.

7. The method of claim 1 wherein determining, using an electronic program guide, an interactive application associated with a broadcast program comprises:
   determining from the electronic program guide, a program identifier;
   determining from the program identifier, a uniform resource locator (URL); and
   determining from the URL, the interactive application associated with the broadcast program.

8. The method of claim 1 wherein determining, using an electronic program guide, an interactive application associated with a broadcast program comprises:
   determining from the electronic program guide, a program identifier;
   determining from the program identifier, a URL;
   determining from the URL, an identifier of the interactive application associated with the program; and
   determining from the identifier of the interactive application, the interactive application associated with the broadcast program.

9. The method of claim 1 wherein determining, using an electronic program guide, an interactive application associated with a broadcast program comprises:
   determining from the electronic program guide, a program identifier;

determining from the program identifier, an identifier of the interactive application associated with the program; and determining from the identifier of the interactive application, the interactive application associated with the broadcast program.

10. The method of claim 1 wherein determining, using an electronic program guide, an interactive application associated with broadcast program comprises:

determining from the electronic program guide, a URL; and determining from the URL, the interactive application associated with the broadcast program.

11. The method of claim 1 wherein determining, using an electronic program guide, an interactive application associated with a broadcast program comprises:

determining from the electronic program guide, a URL;

determining from the URL, an identifier of the interactive application associated with the program; and determining from the identifier of the interactive application, the interactive application associated with the broadcast program.

12. The method of claim 1 wherein determining, using the electronic program guide, an interactive application associated with a broadcast program comprises:

determining from the electronic program guide, an identifier of the interactive application associated with the program; and determining from the identifier of the interactive application, the interactive application associated with the broadcast program.

13. A computer implemented method of controlling a broadcast and reception of an interactive application, comprising:

determining, using an electronic program guide, an interactive application associated with a broadcast program;

controlling the interactive application to maintain synchrony with a display of the broadcast program;

determining timing offsets associated with the broadcast program; and where controlling the interactive application to maintain synchrony with the display of the broadcast program is done in accordance with the timing offsets, wherein the broadcast program is a television show, and wherein controlling the interactive application further comprises:

responsive to determining from the timing offsets that there is a break in the television show, generating a command to suspend execution of the interactive application associated with the television show; and responsive to determining from the timing offsets that the break in the television show has ended, generating a command to resume execution of the interactive application associated with the television show.

14. The method of claim 13 wherein determining timing offsets associated with the broadcast program comprises:

receiving the timing offsets associated with the broadcast program from an external source.

15. The method of claim 14 wherein the external source is a remote server, and receiving the timing offsets comprises:

accessing the remote server via a network connection; and downloading the timing offsets.

16. The method of claim 14 wherein the external source is a national broadcaster that embeds the timing offsets in a vertical blanking interval of the broadcast program.

17. The method of claim 13 wherein determining timing offsets associated with the broadcast program comprises:

determining from the interactive application, timing offsets associated with the broadcast program.

18. The method of claim 13 wherein determining timing offsets associated with the broadcast program comprises:

determining from the electronic program guide, a program identifier; and determining from the program identifier, timing offsets associated with the broadcast program.

19. The method of claim 13 wherein determining timing offsets associated with a broadcast program comprises:

determining from the electronic program guide, a program identifier;

determining from the program identifier, a URL; and determining from the URL, the timing offsets associated with the broadcast program.

20. The method of claim 13 wherein determining timing offsets associated with a broadcast program comprises:

determining from the electronic program guide, a program identifier;

determining from the program identifier, a URL;

determining from the URL, an identifier of an interactive application associated with the program; and determining from the identifier of the interactive application, the timing offsets associated with the broadcast program.

21. The method of claim 13 wherein determining timing offsets associated with a broadcast program comprises:

determining from the electronic program guide, a program identifier;

determining from the program identifier, an identifier of the interactive application associated with the program; and determining from the identifier of the interactive application, the timing offsets associated with the broadcast program.

22. The method of claim 13 wherein determining timing offsets associated with a broadcast program comprises:

determining from the electronic program guide, a URL; and determining from the URL, the timing offsets associated with the broadcast program.

23. The method of claim 13 wherein determining timing offsets associated with a broadcast program comprises:

determining from the electronic program guide, a URL;

determining from the URL, an identifier of the interactive application associated with the program; and determining from the identifier of the interactive application, the timing offsets associated with the broadcast program.

24. The method of claim 13 wherein determining timing offsets associated with a broadcast program comprises:

determining from the electronic program guide, an identifier of the interactive application associated with the program; and determining from the identifier of the interactive application, the timing offsets associated with the broadcast program.

25. The method of claim 13, wherein the broadcast program is a television show, and wherein controlling the interactive application further comprises:

responsive to determining from the timing offsets that an element of the interactive application is to be executed at a time relative to a beginning of the television show, generating a command to execute an element of the interactive application at a given time.

26. The method of claim 13 wherein determining an interactive application using an electronic program guide comprises:
   determining timing information of the broadcast program;
   determining channel information of the broadcast program;
   determining location information of a broadcaster of the broadcast program; and
   determining, using the timing, channel, and location information as inputs to the electronic program guide, the interactive application.

27. The method of claim 13, wherein controlling the interactive application comprises:
   executing, from an interactive application server, commands from the timing offsets for selectively instructing a server to trigger events within interactive applications and to schedule, start, stops, and cancel interactive applications for the broadcast program associated with the timing offsets at corresponding times determined by the timing offsets.

28. The method of claim 13, wherein the electronic program guide resides at least primarily on a viewer's own consumer premise equipment.

29. The method of claim 13, wherein the electronic program guide resides primarily on a server remote from a viewer's own consumer premise equipment.

30. The method of claim 13, wherein the interactive application is run at least primarily on a viewer's own consumer premise equipment.

31. The method of claim 13, wherein the interactive application is run primarily on a server remote from a viewer's own consumer premise equipment.

32. The method of claim 13 further comprising:
   determining, using the electronic program guide, a list of interactive applications associated with the broadcast program, the interactive applications being associated with at least one of the timing offsets;
   pre-fetching the listed interactive applications;
   storing the pre-fetched interactive applications;
   receiving a trigger for one of the fetched applications; and
   inserting one of the interactive applications into a broadcast stream in response to the trigger and the at least one of the timing offsets.

33. The method of claim 13 further comprising:
   determining at a consumer premise equipment(CPE), using the electronic program guide, a list of interactive applications associated with the broadcast program;
   pre-fetching the listed interactive applications and at least one of the timing offsets;
   storing the pre-fetched interactive applications in a storage device coupled to the CPE;
   receiving at the CPE, a trigger for one of the fetched applications; and
   displaying, at the CPE, one of the interactive applications in response to the trigger and the at least one of the timing offsets.

34. The computer implemented method of either claim 32, or claim 33 wherein the trigger is received in the broadcast stream.

35. A computer implemented method of controlling a broadcast and reception of an interactive application, comprising:
   determining, using an electronic program guide, an interactive application associated with a broadcast program;
   controlling the interactive application to maintain synchrony with a display of the broadcast program;
   determining timing offsets associated with the broadcast program; and where
   controlling the interactive application to maintain synchrony with the display of the broadcast program is done in accordance with the timing offsets,
   wherein the broadcast program is a first television show, and wherein controlling the interactive application further comprises:
   responsive to determining from the timing offsets that there is a break in the first television show, generating a command to suspend execution of a first interactive application associated with the first television show;
   responsive to determining from the timing offsets that the first television shown is being broadcast after the break has ended, generating a command to restart execution of the first interactive application; and
   responsive to determining from the timing offsets that a second television show is being broadcast, generating commands to terminate the first interactive application and to begin execution of a second interactive application associated with the second television show.

36. The method of any of claims 13–35, wherein the break is due to a commercial being broadcast.

* * * * *

UNITED STATES PATENT AND TRADEMARK OFFICE
CERTIFICATE OF CORRECTION

PATENT NO. : 7,028,327 B1
APPLICATION NO. : 09/538602
DATED : April 11, 2006
INVENTOR(S) : Dougherty et al.

It is certified that error appears in the above-identified patent and that said Letters Patent is hereby corrected as shown below:

In column 9, line 27, delete "types;" and insert --types: --, therefor.

In column 9, line 45, delete "34" and insert -- E4 --, therefor.

In column 9, line 51, after "10 minutes," delete "10 minutes," and insert -- 10 minutes --, therefor.

In column 9, line 58, after "example" delete "of" and insert -- at --, therefor.

In column 9, line 61, delete "824," and insert -- 824. --, therefor.

In column 20, line 4, in Claim 1, delete "source." and insert -- source, --, therefor.

In column 20, line 31, in Claim 5, after "application" insert -- , --.

In column 21, line 9, in Claim 10, after "with" insert -- a --.

In column 21, line 23, in Claim 12, after "using" delete "the" and insert -- an --, therefor.

In column 23, line 17, in Claim 27, delete "stops," and insert -- stop, --, therefor.

In column 24, line 5, in Claim 33, after "receiving" insert -- , --.

In column 24, line 11, in Claim 34, delete "claim 32," and insert -- claim 32 --, therefor.

In column 24, line 36, in Claim 35, delete "shown" and insert -- show --, therefor.

Signed and Sealed this

Eighth Day of August, 2006

JON W. DUDAS
*Director of the United States Patent and Trademark Office*